United States Patent
Preslan et al.

(10) Patent No.: US 9,405,776 B2
(45) Date of Patent: *Aug. 2, 2016

(54) REMOTE BACKUP AND RESTORE

(71) Applicant: Quest Software, Inc., Aliso Viejo, CA (US)

(72) Inventors: Kenneth Preslan, Minneapolis, MN (US); Matthew T. O'Keefe, Mahtomedi, MN (US); Todd Ortberg, Carver, MN (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,071

(22) Filed: Apr. 24, 2013

(65) Prior Publication Data

US 2013/0246366 A1  Sep. 19, 2013

Related U.S. Application Data

(63) Continuation of application No. 12/567,069, filed on Sep. 25, 2009, now Pat. No. 8,452,731.

(60) Provisional application No. 61/100,140, filed on Sep. 25, 2008.

(51) Int. Cl.
  *G06F 17/30* (2006.01)
  *G06F 11/14* (2006.01)
  *G06F 3/06* (2006.01)

(52) U.S. Cl.
  CPC ...... *G06F 17/30289* (2013.01); *G06F 11/1453* (2013.01); *G06F 11/1464* (2013.01); *G06F 3/067* (2013.01); *G06F 17/30067* (2013.01)

(58) Field of Classification Search
  CPC ............ G06F 11/1453; G06F 11/1464; G06F 17/30067; G06F 17/30289; G06F 3/067
  USPC ......................................................... 707/652
  See application file for complete search history.

(56) References Cited

U.S. PATENT DOCUMENTS

| 4,309,569 | A | 1/1982 | Merkle |
| 5,005,122 | A | 4/1991 | Griffin et al. |

(Continued)

OTHER PUBLICATIONS

Jain et al., "TAPER: Tiered Approach for Eliminating Redundancy in Replica Synchronization", In Proceedings of the 4th USENIX Conference on File and Storage Technologies (FAST '05), pp. 281-294, 2005.*

(Continued)

*Primary Examiner* — Phuong Thao Cao
(74) *Attorney, Agent, or Firm* — Winstead PC

(57) ABSTRACT

In one embodiment of the present invention, a data-backup method includes partitioning a fingerprint namespace among a cluster of backup servers, the fingerprint namespace comprising fingerprints for representing units of data, each backup server of the cluster of backup servers managing units of data having fingerprints corresponding to an assigned partition of the fingerprint namespace. The method further includes receiving backup information from a client computing device for a block of data comprising units of data, the backup information including at least a fingerprint for each of the units of data and client-specific backup information. In addition, the method includes, utilizing the fingerprint for each of the units of data, deduplicating the units of data in parallel at the cluster of backup servers in accordance with the partitioning step, the deduplicating step comprising identifying ones of the units data already stored by the cluster of backup servers.

30 Claims, 7 Drawing Sheets

(56) References Cited

U.S. PATENT DOCUMENTS

| | | | | |
|---|---|---|---|---|
| 5,778,395 | A * | 7/1998 | Whiting | G06F 11/1464 |
| 5,819,020 | A | 10/1998 | Beeler, Jr. | |
| 5,974,563 | A | 10/1999 | Beeler, Jr. | |
| 5,990,810 | A | 11/1999 | Williams | |
| 6,564,252 | B1 * | 5/2003 | Hickman et al. | 709/214 |
| 6,683,873 | B1 | 1/2004 | Kwok et al. | |
| 6,704,730 | B2 | 3/2004 | Moulton et al. | |
| 6,785,786 | B1 * | 8/2004 | Gold | G06F 11/1461 711/162 |
| 6,865,655 | B1 | 3/2005 | Andersen | |
| 6,928,526 | B1 * | 8/2005 | Zhu et al. | 711/154 |
| 7,020,698 | B2 | 3/2006 | Andrews et al. | |
| 7,065,619 | B1 * | 6/2006 | Zhu et al. | 711/162 |
| 7,305,532 | B2 * | 12/2007 | Zhu et al. | 711/162 |
| 7,379,875 | B2 * | 5/2008 | Burges et al. | 704/273 |
| 7,401,093 | B1 | 7/2008 | Hamilton et al. | |
| 7,441,092 | B2 * | 10/2008 | Lyon | 711/162 |
| 7,546,325 | B2 * | 6/2009 | Kamei et al. | |
| 7,552,214 | B2 | 6/2009 | Venkatasubramanian | |
| 7,657,581 | B2 * | 2/2010 | Orenstein et al. | 707/661 |
| 7,676,551 | B1 * | 3/2010 | Dalia et al. | 709/218 |
| 7,680,998 | B1 * | 3/2010 | Auchmoody | G06F 17/30191 707/648 |
| 7,685,459 | B1 * | 3/2010 | De Spiegeleer | G06F 11/1453 714/6.12 |
| 7,747,584 | B1 * | 6/2010 | Jernigan, IV | 707/692 |
| 7,783,682 | B1 | 8/2010 | Patterson | |
| 7,783,932 | B1 | 8/2010 | Eigen et al. | |
| 7,788,220 | B1 * | 8/2010 | Auchmoody et al. | 707/609 |
| 7,797,279 | B1 * | 9/2010 | Starling | G06F 11/1451 707/641 |
| 7,801,859 | B1 * | 9/2010 | Desai | G06F 17/30067 707/640 |
| 7,900,002 | B2 | 3/2011 | Lyon | |
| 7,913,163 | B1 * | 3/2011 | Zunger | G06F 17/30864 715/234 |
| 7,916,629 | B2 * | 3/2011 | Shi et al. | 370/218 |
| 7,962,520 | B2 | 6/2011 | Patterson et al. | |
| 8,005,861 | B2 * | 8/2011 | Reddy et al. | 707/790 |
| 8,041,735 | B1 * | 10/2011 | Lacapra et al. | 707/783 |
| 8,041,907 | B1 | 10/2011 | Wu et al. | |
| 8,082,228 | B2 | 12/2011 | Mu | |
| 8,126,847 | B1 * | 2/2012 | Zheng | G06F 11/1469 707/640 |
| 8,166,012 | B2 | 4/2012 | Reddy et al. | |
| 8,180,983 | B1 * | 5/2012 | Jernigan | G06F 3/061 707/827 |
| 8,190,835 | B1 * | 5/2012 | Yueh | 711/162 |
| 8,190,836 | B1 * | 5/2012 | Zheng | G06F 3/0608 711/162 |
| 8,200,638 | B1 * | 6/2012 | Zheng | G06F 11/1464 707/679 |
| 8,200,923 | B1 * | 6/2012 | Healey et al. | 711/162 |
| 8,204,868 | B1 * | 6/2012 | Wu et al. | 707/693 |
| 8,234,250 | B1 * | 7/2012 | Sharma et al. | 707/649 |
| 8,311,985 | B2 | 11/2012 | O'Keefe et al. | |
| 8,352,692 | B1 * | 1/2013 | Jordan | 711/162 |
| 8,452,731 | B2 * | 5/2013 | Preslan | G06F 11/1453 707/652 |
| 8,578,126 | B1 * | 11/2013 | Gaonkar | G06F 3/061 711/201 |
| 8,671,082 | B1 * | 3/2014 | Yadav | G06F 17/30156 707/692 |
| 8,832,466 | B1 * | 9/2014 | McGregor, Jr. | H04L 9/0836 380/37 |
| 9,002,800 | B1 * | 4/2015 | Yueh | G06F 12/145 707/640 |
| 2003/0120751 | A1 | 6/2003 | Husain et al. | |
| 2004/0030852 | A1 * | 2/2004 | Coombs | G06F 11/1448 711/162 |
| 2004/0230862 | A1 * | 11/2004 | Merchant et al. | 714/6 |
| 2004/0243578 | A1 | 12/2004 | Chan et al. | |
| 2005/0021574 | A1 * | 1/2005 | Miller et al. | 707/204 |
| 2007/0005669 | A1 * | 1/2007 | Mueller | G06F 17/30312 |
| 2007/0174661 | A1 * | 7/2007 | Peddada | 714/4 |
| 2007/0179999 | A1 * | 8/2007 | Kamei et al. | 707/204 |
| 2007/0219773 | A1 | 9/2007 | Roux et al. | |
| 2007/0250674 | A1 * | 10/2007 | Fineberg et al. | 711/162 |
| 2007/0294321 | A1 | 12/2007 | Midgley et al. | |
| 2008/0005141 | A1 * | 1/2008 | Zheng et al. | 707/101 |
| 2008/0077762 | A1 * | 3/2008 | Scott | G06F 3/0608 711/170 |
| 2008/0148056 | A1 | 6/2008 | Ginter et al. | |
| 2008/0154989 | A1 | 6/2008 | Arman | |
| 2008/0168111 | A1 * | 7/2008 | Lyon | 707/204 |
| 2008/0208933 | A1 | 8/2008 | Lyon | |
| 2008/0294660 | A1 * | 11/2008 | Patterson et al. | 707/100 |
| 2008/0294704 | A1 * | 11/2008 | Akagawa | G06F 11/1469 |
| 2008/0294933 | A1 | 11/2008 | Nishii et al. | |
| 2009/0019047 | A1 * | 1/2009 | Anderson et al. | 707/8 |
| 2009/0049260 | A1 * | 2/2009 | Upadhyayula | 711/162 |
| 2009/0094252 | A1 | 4/2009 | Wong et al. | |
| 2009/0164529 | A1 | 6/2009 | McCain | |
| 2009/0196169 | A1 * | 8/2009 | Shi et al. | 370/218 |
| 2009/0240744 | A1 * | 9/2009 | Thomson et al. | 707/204 |
| 2009/0254609 | A1 | 10/2009 | Wideman | |
| 2009/0313447 | A1 * | 12/2009 | Nguyen et al. | 711/162 |
| 2010/0042598 | A1 | 2/2010 | Shinjo et al. | |
| 2010/0088296 | A1 * | 4/2010 | Periyagaram | G06F 3/061 707/705 |
| 2010/0106691 | A1 * | 4/2010 | Preslan | G06F 11/1453 707/674 |
| 2010/0106855 | A1 | 4/2010 | Luessem et al. | |
| 2010/0114832 | A1 * | 5/2010 | Lillibridge | G06F 17/30088 707/649 |
| 2010/0153481 | A1 | 6/2010 | Ginkel et al. | |
| 2010/0281051 | A1 * | 11/2010 | Sheffi et al. | 707/770 |
| 2011/0099351 | A1 | 4/2011 | Condict | |
| 2011/0208796 | A1 | 8/2011 | Riley et al. | |
| 2011/0270887 | A1 * | 11/2011 | Reddy et al. | 707/790 |

OTHER PUBLICATIONS

Won et al., "Efficient Index Lookup for De-Duplication Backup System", IEEE International Symposium on Modeling, Analysis and Simulation of Computers and Telecommunication Systems, Sep. 8-10, 2008, 3 pages.*

Yang et al., "FBBM: A new Backup Method with Data De-duplication Capability", In Proceedings of the 2008 International Conference on Multimedia and Ubiquitous Engineering, Apr. 24-26, 2008, pp. 30-35.*

Yang et al., "DEBAR: A Scalable High-Performance De-duplication Storage System for Backup and Archiving", Computer Science and Engineering Technical Reports, Jan. 5, 2009, 19 pages.*

Lillibridge, M., et al., "Sparse Indexing: Large Scale, Inline Deduplication Using Sampling and Locality", Jan. 14, 2009, (28 pages).

Brin, Sergey et al., "Copy Detection Mechanisms for Digital Documents", 1995 (12 pages).

Tomasic, Anthony et al., "Caching and Database Scaling in Distributed Shared-Nothing Information Retrieval Systems", Proceedings of SIGMOD, 1993, (10 pages).

Manber, Udi, "Finding Similar Files in a Large File System", http://usenix.org/publications/library/proceedings/sf94/full_papers/manber.finding, Oct. 3, 2008, pp. 1-14.

McVoy, L.W. et al., "Extent-like Performance from a UNIX File System", USENIX—Winter 1991, Dallas, TX, pp. 1-11.

Tridgell, Andrew, "Efficient Algorithms for Sorting and Synchronization", A thesis submitted for the degree of Doctor of Philosophy at The Australian National University, Feb. 1999, pp. 1-106.

Eshghi, Kave et al., "A Framework for Analyzing and Improving Content-Based Chunking Algorithms", Hewlett-Packard Development Company, L.P., 2005, pp. 1-10.

Young, Lee W., "International Search Report for PCT/US09/56884" as mailed Nov. 2, 2009, (4 pages).

Young, Lee W., "International Search Report" for PCT/US09/58370, as mailed Nov. 25, 2009 (3 pages).

Patterson, David A., "Computer Architecture a Quantitative Approach", Morgan Kaufmann Publishers, Inc., 1990, (12 pages).

Folk, Michael J., "File Structures an Object-Oriented Approach with C++", Addison-Wesley, Mar. 1998, (11 pages).

(56) References Cited

OTHER PUBLICATIONS

Sleepycat Software, Inc, "Berkeley DB", New Riders Publishing, Jun. 2001, (5 pages).

Won et al., "Efficient Index Lookup for De-duplication Backup System", in Proceedings of IEEE International Symposium Modeling, Analysis and Simulation of Computers and Telecommunication Systems (MASCOTS'08), Sep. 2008, pp. 1-3.

* cited by examiner

REMOTE BACKUP AND RESTORE

CROSS-REFERENCE TO RELATED APPLICATIONS

This Application is a continuation of U.S. patent application Ser. No. 12/567,069 filed on Sep. 25, 2009, which is now U.S. Pat. No. 8,452,731. U.S. Pat. No. 8,452,731 claims priority from U.S. Provisional Application No. 61/100,140 filed on Sep. 25, 2008. U.S. Pat. No. 8,452,731 and U.S. Provisional Application No. 61/100,140 are hereby incorporated by reference.

BACKGROUND

1. Technical Field

The present invention relates generally to backup of computer systems and, more particularly, but not by way of limitation, to non-redundant backup of computer systems on a cluster of backup servers.

2. History of Related Art

As computing and networking technologies continue to improve in performance and capabilities at a lower cost, more computing is performed on computers that are constantly mobile (e.g., laptops and cell phones) or found at remote sites (e.g., servers operated at remote offices). Backup, restore and archiving operations are best performed from remote or mobile computers back to a centralized data center. However, an amount of local-disk storage for these computers increases at a rate over time that is higher than an increase in an amount of backup storage and an amount of network bandwidth available to the centralized data center.

Deduplication of redundant data on the centralized data center is one way of mitigating the amount of backup storage that is necessary. However, standard deduplication technologies fail to address network-bandwidth concerns. In addition, deduplication is a performance-intensive process that considerably increases demand on computing resources, including processing power. Therefore, computer-resource requirements for standard deduplication technologies are increasing at an unsustainable rate.

SUMMARY OF THE INVENTION

In one embodiment of the present invention, a method includes partitioning a fingerprint namespace among a cluster of backup servers, the fingerprint namespace comprising a universe of fingerprints for representing units of data, each backup server of the cluster of backup servers managing units of data having fingerprints corresponding to an assigned partition of the fingerprint namespace. The method further includes receiving backup information from a client computing device for a block of data comprising units of data, the backup information including at least a fingerprint for each of the units of data and client-specific backup information. In addition, the method includes, utilizing the fingerprint for each of the units of data, deduplicating the units of data in parallel at the cluster of backup servers in accordance with the partitioning step, the deduplicating step comprising identifying ones of the units data already stored by the cluster of backup servers.

In another embodiment of the present invention, a computer-program product includes a computer-usable medium having computer-readable program code embodied therein, the computer-readable program code adapted to be executed to implement a data-backup method. The data-backup method includes partitioning a fingerprint namespace among a cluster of backup servers, the fingerprint namespace comprising a universe of fingerprints for representing units of data, each backup server of the cluster of backup servers managing units of data having fingerprints corresponding to an assigned partition of the fingerprint namespace. The data-backup method further includes receiving backup information from a client computing device for a block of data comprising units of data, the backup information including at least a fingerprint for each of the units of data and information related to a structure of the block of data. Additionally, the data-backup method includes utilizing the fingerprint for each of the units of data, deduplicating the units of data in parallel at the cluster of backup servers in accordance with the partitioning step, the deduplicating step comprising identifying ones of the units data already stored by the cluster of backup servers.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be constructed as limited to the embodiments set forth herein; rather, the embodiments are provided so that this disclosure will be thorough and complete, and will fully convey the scope of the invention to those skilled in the art.

In various embodiments, it is advantageous to remove redundant data from data being backed up, reduce time required by and overhead of backup operations, more efficiently utilize limited computer-network bandwidth and processing power, and reduce an amount of backup data that must be retained. For example, by scanning a file system and processing each file in the file system, it is possible to divide each file into units of data. In a typical embodiment, each unit of data may be uniquely represented by a fingerprint. By comparing fingerprints between units of data, whether the units of data originated at the file system or from another source, redundancy can be detected. In various embodiments, numerous advantages, including those listed above, may be realized thereby.

Figure 1:
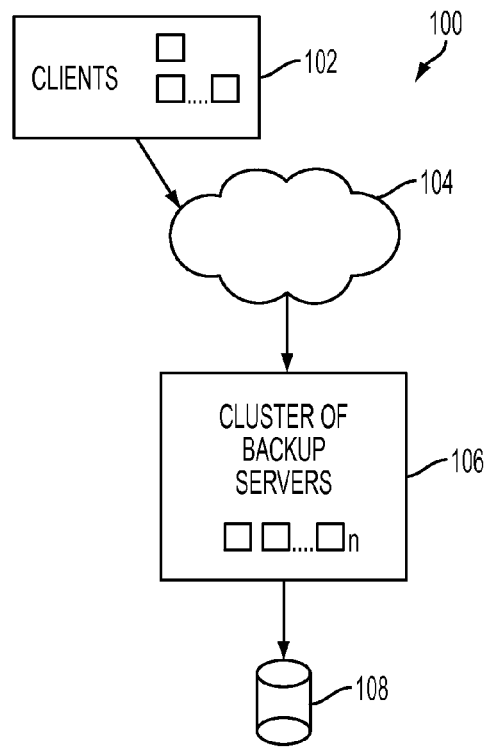
FIG. 1 illustrates a client-server system for executing a deduplication protocol.

FIG. 1 illustrates a client-server system 100 for executing a deduplication protocol according to principles of the invention. In a typical embodiment, the deduplication protocol specifies polices for ensuring that data from multiple computing devices may be backed up in a non-redundant manner to a cluster of backup servers 106. By backing up in the non-redundant manner, data is backed up in such a way that, even when some data is identically present on multiple clients, the data will only be stored once by the cluster of backup servers 106. As shown, a plurality of client computing devices 102 may communicate over a computer network 104 with the cluster of backup servers 106. In a typical embodiment, each backup server in the cluster of backup servers 106 is operable to non-redundantly store data from the plurality of client computing devices 102 in a data-storage area 108. In a typical embodiment, the cluster of backup servers 106 and the plurality of client computing devices 102 collaborate in execution of the deduplication protocol. In some embodiments, generic cluster-management services that are native to a specific platform, such as, for example, Linux or Windows, may be used. In other embodiments, proprietary cluster-management services may be utilized.

One of ordinary skill in the art will recognize that the plurality of client computing devices 102 may be of a variety of types, including laptops, desktop computers, smartphones, servers, and the like. In some embodiments, it is contemplated that the plurality of client computing devices 102 are virtual clients resident on a physical server. As one of ordinary skill in the art will appreciate, the virtual clients typically represent independent computing-operating environments that share resources of the physical server. Other types for the plurality of client computing devices 102 other than those listed herein will be apparent to one of ordinary skill in the art.

Figure 2:
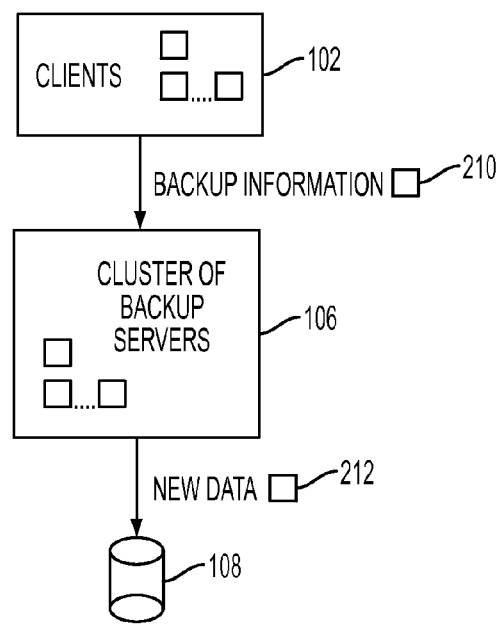
FIG. 2 is a data-flow with respect to a plurality of client computing devices and a cluster of backup servers depicted in FIG. 1.

FIG. 2 illustrates a data-flow 200 with respect to the plurality of client computing devices 102 and the cluster of backup servers 106 depicted in FIG. 1. The plurality of client computing devices 102 can transmit backup information 210 to the cluster of backup servers 106. The backup information 210 may include, for example, data to be backed up and client-specific backup information for the data to be backed up. By way of further example, the client-specific backup information for the data to be backed up may include a structure of the data to be backed up and necessary information for reconstructing the data to be backed up in the event a data restoration is required. In a typical embodiment, the cluster of backup servers 106 may be operable to identify new data 212 that is not already stored in the data-storage area 108. In a typical embodiment, according to the deduplication protocol, only the new data 212 is stored in the data-storage area 108.

Figure 3A:
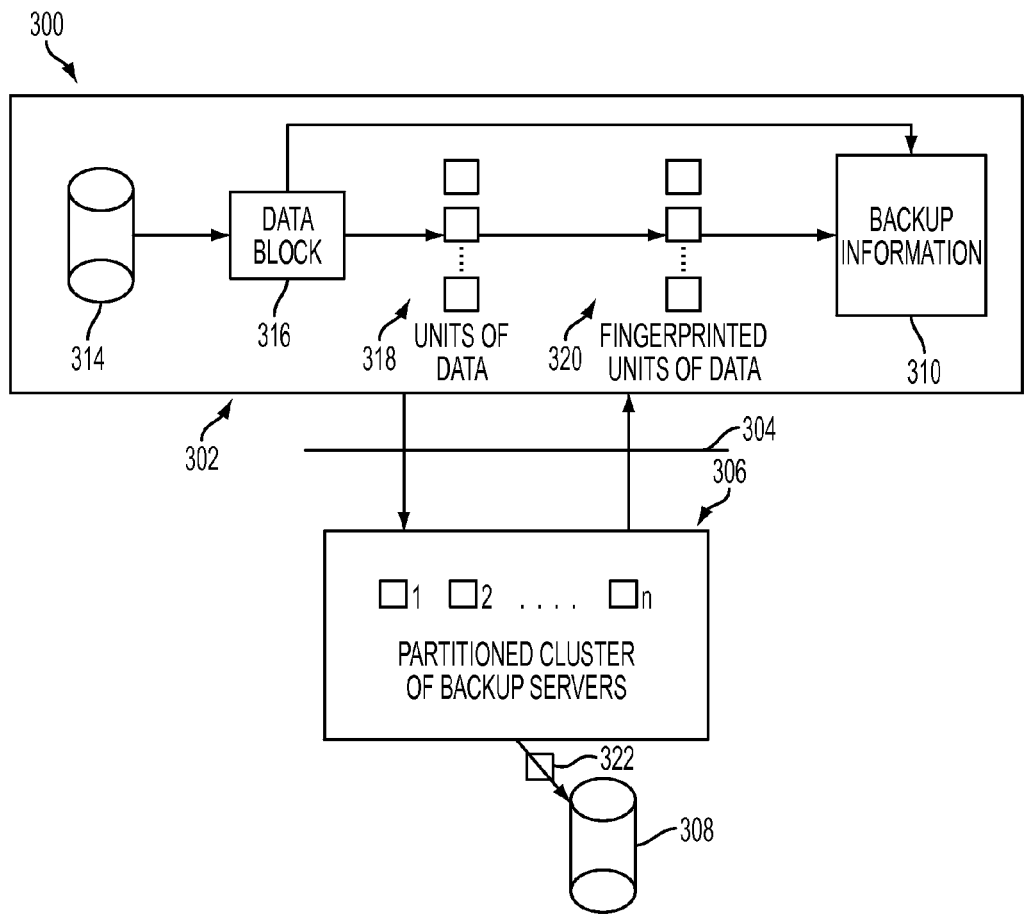
FIG. 3A illustrates a system for non-redundantly backing up data in a clustered environment.

FIG. 3A illustrates a system 300 for non-redundantly backing up data in a clustered environment according to a deduplication protocol. As illustrated, a client computing device 302 is operable to communicate with a cluster of backup servers 306 over a computer network 304. The client computing device 302 may have resident thereon a storage medium 314 such as, for example, a hard-disk drive. The system 300, in various embodiments, may be utilized for full, incremental, and differential backups. In the case of a full backup, the client computing device 302 is operable to initiate backup of a block of data 316 from the storage medium 314 to the cluster of backup servers 306. The block of data 316, in various embodiments, may constitute an entirety of the storage medium 314, a partition on the storage medium 314, or any other logical or structural portion resident on the storage medium 314.

In a typical embodiment, the client computing device 302 is operable to divide the block of data 316 into units of data 318. The units of data 318 may be, for example, files, parts of files, and the like. Generally, the units of data 318 collectively compose the block of data 316. The client computing device 302 typically is also operable to fingerprint the units of data 318 based on contents of the units of data 318 to generate fingerprinted units of data 320. Each fingerprinted unit of data in the fingerprinted units of data 320 generally has a fingerprint that serves to distinguish the contents of the fingerprinted unit of data from others of the fingerprinted units of data 320. The fingerprint for each unit of data in the fingerprinted units of data 320 may be, for example, a text or numerical string generated by executing a hash function on the contents of the fingerprinted unit of data.

In a typical embodiment, the client computing device 302 is operable to generate backup information 310 for the block of data 316 using the fingerprinted units of data 320 and a structure of the units of data 318 within the block of data 316. The backup information 310 may include, for example, the fingerprinted units of data 320 and client-specific backup information for the fingerprinted units of data 320. The client-specific backup information for the fingerprinted units of data may include, for example, a structure of the block of data 316 and necessary information for reconstructing the block of data 316 in the event a data restoration is required.

Figure 3B:
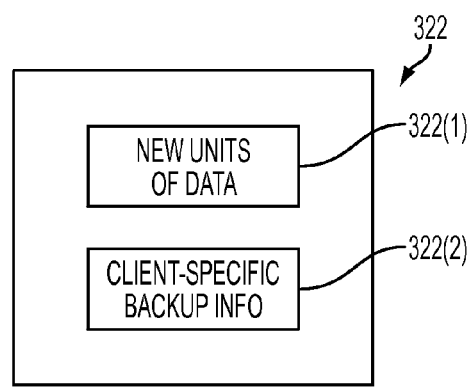
FIG. 3B illustrates new data identified by a cluster of backup servers.

Still referring to FIG. 3A, the client computing device 302 coordinates with the cluster of backup servers 306 to facilitate identification, by the cluster of backup servers 306, of new data 322. As shown in FIG. 3B, the new data 322 includes both new units of data 322(1) and client-specific backup information 322(2). Exemplary methods that may be used by the client computing device 302 to coordinate with the cluster of backup servers 306 will be described in more detail relative to the ensuing figures. The new units of data 322(1) typically represent units of data that are not, as of a time of identification, stored in a backup-data storage area 308 communicably coupled to the cluster of backup servers 306.

In a typical embodiment, the new units of data 322(1) may be identified by comparing the fingerprint for each fingerprinted unit of data in the fingerprinted units of data 320 with fingerprints for units of data already stored in the backup-data storage area 308. In that way, redundant storage of the units of data already stored in the backup-data storage area 308 may be prevented. Instead, for each unit of data in the units of data already stored in the backup-data storage area 308 that are also among the fingerprinted units of data 320 of the client computing device 302, a pointer to the unit of data already stored in the backup-data storage area 308 is associated with the client-specific backup information 322(2) for the client computing device 302. The client-specific backup information 322(2) may be stored in the backup-data storage area 308 or, in some embodiments, stored separately in one or more storage areas set aside for such storage.

As mentioned above, the system 300, in some embodiments, may additionally be utilized for incremental and differential backups of the block of data 316. The client computing device 302 typically locally stores information describing the most recent backup. Therefore, in a typical embodiment, the client computing device is operable to recognize changes to the block of data 316 and send corresponding updates to the cluster of backup servers 306 for purposes of synchronization.

The cluster of backup servers 306 may be partitioned so as to share and process in parallel activities related to the non-redundant storage of data. For example, a fingerprint namespace may be defined that includes a universe of possible fingerprints for fingerprinted units of data such as, for example, the fingerprinted units of data 320. In various embodiments, each backup server in the cluster of backup servers 306 may be assigned a partition of the fingerprint namespace. In that way, each backup server in the cluster of backup servers 306 is a partition master for a partition of the fingerprint namespace.

As used herein, the term partition master refers to a backup server that is responsible for storage and management of units of data for a partition of a fingerprint namespace. The partition master typically has a two-fold responsibility. First, the partition master is generally operable to manage units of data already stored in a backup-data storage area, such as, for example, the backup-data storage area 308, for an assigned partition of the fingerprint namespace. Management of the units of data already stored in the backup-data storage area may include, for example, data-restoration activities, data-retention-policy enforcement, and the like. Second, the partition master is generally operable to determine whether incoming fingerprinted units of data from a client computing device such as, for example, the fingerprinted units of data 320, are new units of data. The determination of whether the incoming fingerprinted units of data are new units of data may be, for example, similar to that described relative to the new data 322 of FIGS. 3A and 3B.

Figure 4:
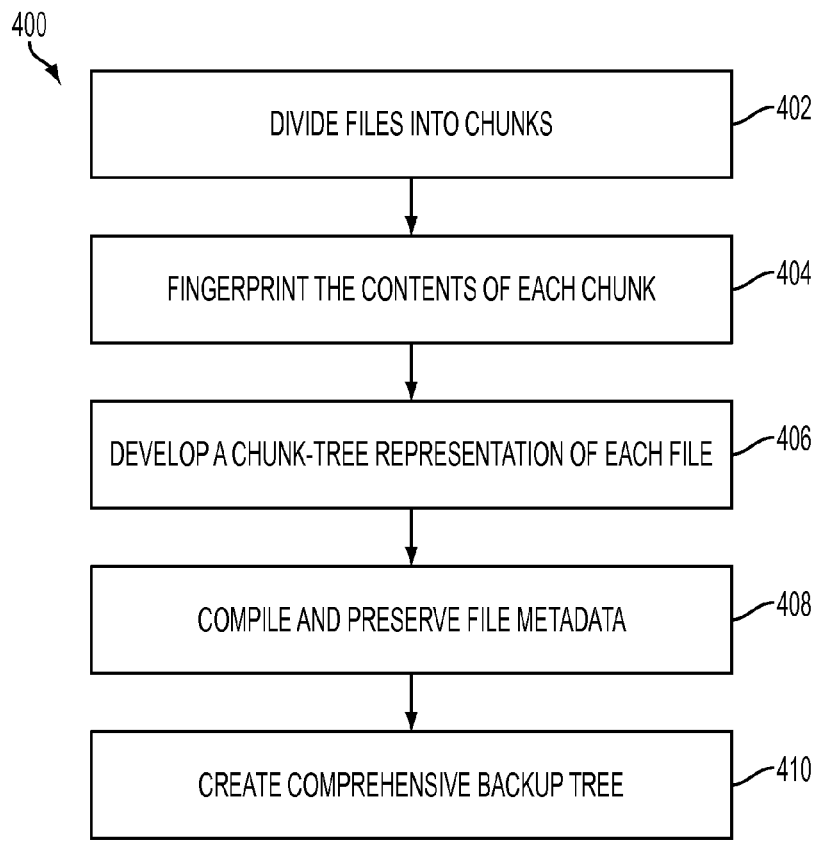
FIG. 4 illustrates a process that may occur on a client computing device when performing a backup.

FIG. 4 illustrates a process 400 that, as part of a deduplication protocol, may occur on a client computing device when performing a full backup. As will be apparent to one of ordinary skill in the art, the deduplication protocol represented in the process 400 operates at a sub-file level; that is, deduplication as described may occur relative to parts of files rather than whole files. As used herein, a chunk is a unit of data that forms part of a file in a block of data.

The process 400 begins with step 402. At step 402, each file in a block of data such as, for example, the block of data 316 of FIG. 3A, may be divided into a plurality of chunks. The plurality of chunks, in various embodiments, may be, for example, fixed-size chunks or variable-sized chunks. In one example, if it is desired to divide files into variable-sized chunks based on content, an algorithm may be implemented that combines a rolling hash technique with a two-threshold two-divisor (TTTD) technique. For example, a rolling hash may move along a file to produce hash values at every byte offset of the file. As the rolling hash moves along the file, if a hash value at a certain byte offset modulo a desired average hash size is equal to a predetermined value (e.g., zero), then the byte offset may be considered the last byte in a new chunk. The TTTD technique may then be used to ensure that the new chunk meets minimum and maximum size requirements. In various embodiments, the algorithm may be used, for example, for all files in the block of data to ensure chunks that change minimally in terms of size and number in the face of small changes to the file. In other embodiments, one or more other fixed-size or variable-sized chunking algorithms may be utilized. From step 402, the process 400 proceeds to step 404.

At step 404, contents of each of the plurality of chunks are fingerprinted. In a typical embodiment, as a result, a fingerprint is assigned to each chunk in the plurality of chunks. In some embodiments, the contents of each of the plurality of chunks may be fingerprinted, for example, by applying a cryptographic hash function to the contents. In that way, a cryptographic hash signature may be generated as a fingerprint that can uniquely describe the contents of each of the plurality of chunks. One example of a cryptographic hash function that may be used in various embodiments of the invention is SHA-1, which cryptographic hash function is a function developed by the National Security Agency (NSA).

In a typical embodiment, for each chunk in the plurality of chunks, the cryptographic hash signature may be assigned as a name of the chunk. Generally, chunks with the same name are assumed to be identical and can be deduplicated; that is, as chunks are created, chunks having identical names need only be stored once. One of ordinary skill in the art will note that, if the cryptographic hash function utilizes a large number of bits, this is a good assumption.

For each file in the block of data, cumulative results of steps 402 and 404 are a chunk file that contains all chunks for the file concatenated together, a chunk list that contains a list of names (e.g., cryptographic hash signatures) of the chunks for the file in the same order as the chunk file, and an extendible hash table that indexes locations of chunks in the chunk file. In other words, in a typical embodiment, concatenating chunks of the chunk file together into a stream in the order listed in the chunk list, for each file in the block of data, would recreate the block of data. From step 404, the process 400 proceeds to step 406.

At step 406, a chunk-tree representation is developed for the block of data. As one of ordinary skill in the art will appreciate, a chunk list can be very long for a large file. Therefore, in various embodiments, it is advantageous to chunk the chunk list to obtain a new set of chunks and a shorter chunk list. In other words, the chunk list is chunked in a manner similar to which the file was originally chunked into the plurality of chunks to yield the shorter chunk list. In a typical embodiment, it is further advantageous to repeatedly chunk the chunk list until the chunk list contains only one chunk. The one chunk may be considered a root of the chunk tree for the file. One of ordinary skill in the art will note that a chunk tree as described here may more formally be called a hash-based directed acyclic graph (HDAG). Development of a chunk tree will be discussed more specifically with respect to FIG. 6. From step 406, the process 400 proceeds to step 408.

At step 408, file metadata may be compiled and preserved. Once a file is encoded into a chunk tree as described in step 406, the metadata may be compiled, for example, by scanning through a file system of the block of data for encoding files containing the metadata. Subsequently, for each file of the block of data, the root of the chunk tree may be packaged with metadata about the file, such as, for example, name, ownership, permissions, timestamps, and data-integrity hashing information, into a metadata blob that describes the file. In some embodiments, the metadata blob can point to more than one tree such as, for example, when files have extended attribute streams or alternate data streams. In a typical embodiment, a catalog file is created for each file in the block of data that is encountered. The catalog file and the chunks it references contain a complete description of each file in the block of data being backed up. The catalog file, which can be large, is then chunked into a catalog tree in a manner similar to that described above with respect to the chunk list. An exemplary embodiment of chunking a catalog file into a catalog tree is described in more detail relative to FIG. 7. From step 408, the process 400 proceeds to step 410.

At step 410, a comprehensive backup tree for the block of data is generated. In various embodiments, the catalog tree generated at step 408 may be supplemented with the chunk tree developed in step 406. The catalog tree combined with the chunk trees of each file referenced by the catalog may, in some embodiments, constitute the comprehensive backup tree. The comprehensive backup tree typically represents an entirety of a backup of the block of data. An exemplary embodiment of a comprehensive backup tree will be described in more detail relative to FIG. 7. From step 410, the process 400 proceeds to step 412. After step 412, the process 400 ends.

Figure 5:
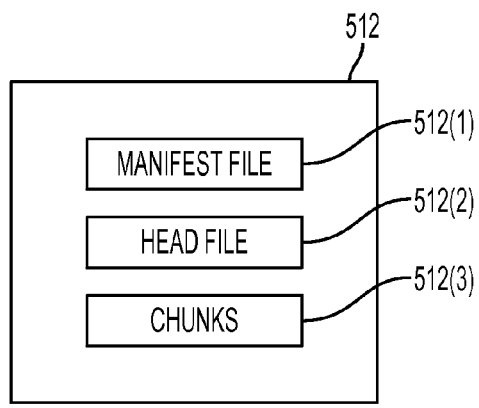
FIG. 5 illustrates backup information that may be generated as part of the process of FIG. 4.

FIG. 5 illustrates backup information 512 that, in various embodiments, may be generated as part of, for example, the process 400 of FIG. 4. The backup information 512 includes, for example, a manifest file 512(1), a head file 512(2), and a plurality of chunks 512(3) from a block of data. The manifest file 512(1) contains a list of chunks referenced by the comprehensive backup tree, including the chunks of the catalog file and the chunks for each file of the block of data. The head file 512(2) includes the root of the comprehensive backup tree, which information is a starting point of any restore operation.

Figure 6:
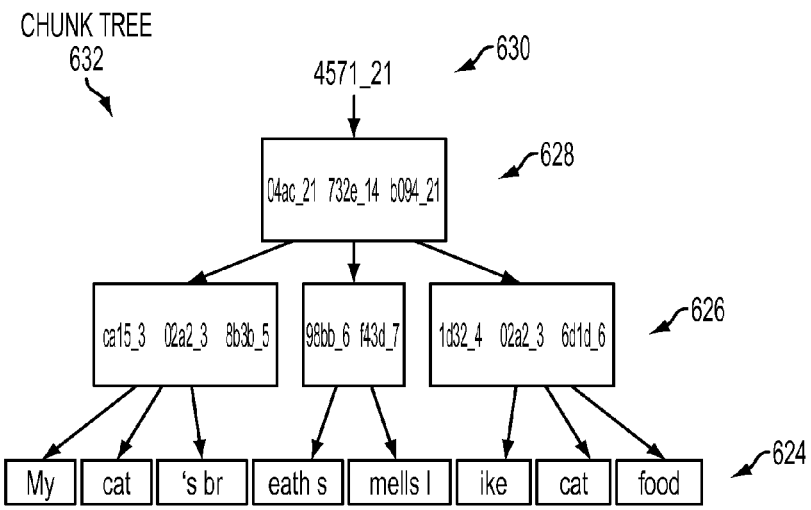
FIG. 6 illustrates a chunk tree according to principles of the invention.

FIG. 6 illustrates a chunk tree 632 according to principles of the invention. Leaves of the chunk tree 632 correspond to a plurality of chunks 624 resulting from, for example, dividing a file into chunks. As shown, the plurality of chunks 624 are chunked into a chunk list 626 using, for example, a cryptographic hash function as described above to yield, for example, a cryptographic hash signature for each chunk in the chunk list 626. The chunk list 626, in a similar manner, may be further chunked into a chunked list 628, which list may be further chunked into a root 630 of the chunk tree 632.

Figure 7:
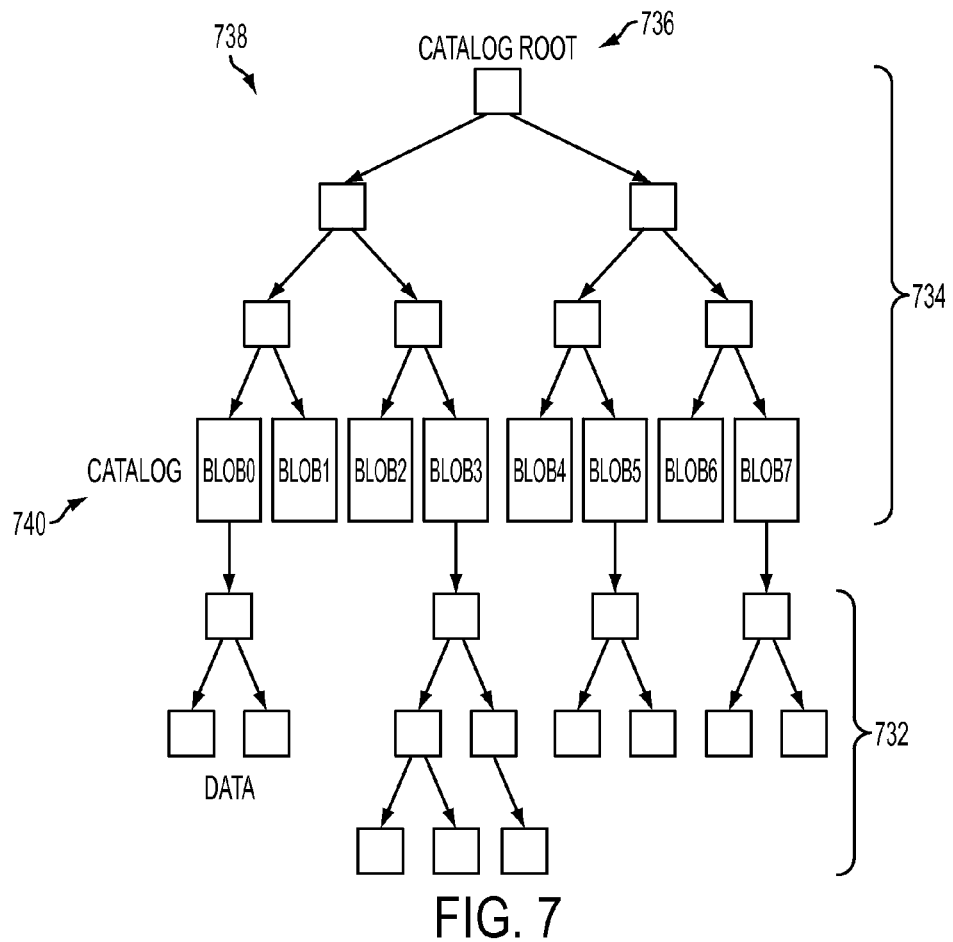
FIG. 7 illustrates a catalog tree and a comprehensive backup tree according to principles of the invention.

FIG. 7 illustrates a catalog tree 734 and a comprehensive backup tree 738 according to principles of the invention. The catalog tree 734 shown includes a plurality of metadata blobs 740. The plurality of metadata blobs 740 are then shown to be chunked in a manner similar to that described above in FIG. 6 until only a catalog root 736 remains. The catalog tree 734 may be supplemented as shown in FIG. 7 with a plurality of chunk trees extending from the plurality of metadata blobs 740 to form the comprehensive backup tree 738.

Figure 8:
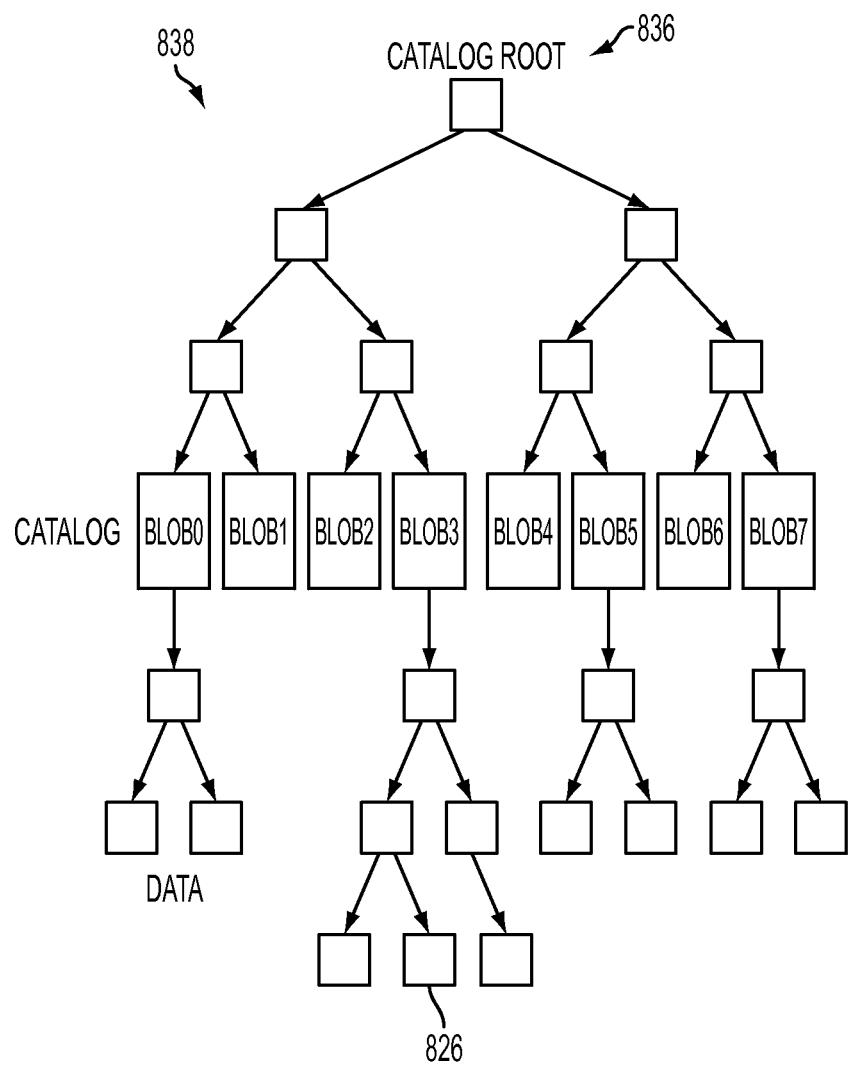
FIG. 8 illustrates a comprehensive backup tree according to principles of the invention.

FIG. 8 illustrates a comprehensive backup tree 838 according to principles of the invention. The comprehensive backup tree 838 illustrates that a change occurring in a data chunk 826 that is a leaf of the comprehensive backup tree 838 only results in a corresponding change in direct parents in the comprehensive backup tree 838 that propagates through to a catalog root 836. Because a small change results in a corresponding small change in the catalog tree, as described below, a number of chunks that must be sent across a network for backup may be reduced.

In some embodiments, a client computing device generally stores data from a previous backup, including catalog and manifest files. Therefore, when it is time to perform a subsequent backup that is not a full backup, software on the client computing device may simply identify changes since the previous backup. Any new or changed files may be chunked as described above. Additionally, any chunks that are not listed in a manifest file for the previous backup may be saved for possible pushing to a backup server in a cluster of backup servers. Subsequently, a new catalog file and comprehensive backup tree may be constructed. Using this information, a new head file and a new manifest file listing the chunks referenced by the new catalog file may be created. In some embodiments, the new head file, the new manifest file, and chunks are pushed across the network to the backup server in a manner similar to that described relative to a full backup. In other embodiments, as an optimization, rather than send the new manifest file, a manifest file that only lists changes since the manifest file for the previous backup may be sent. As one of ordinary skill in the art will recognize, this procedure may be utilized, for example, in performing incremental and differential backups.

Figure 9A:
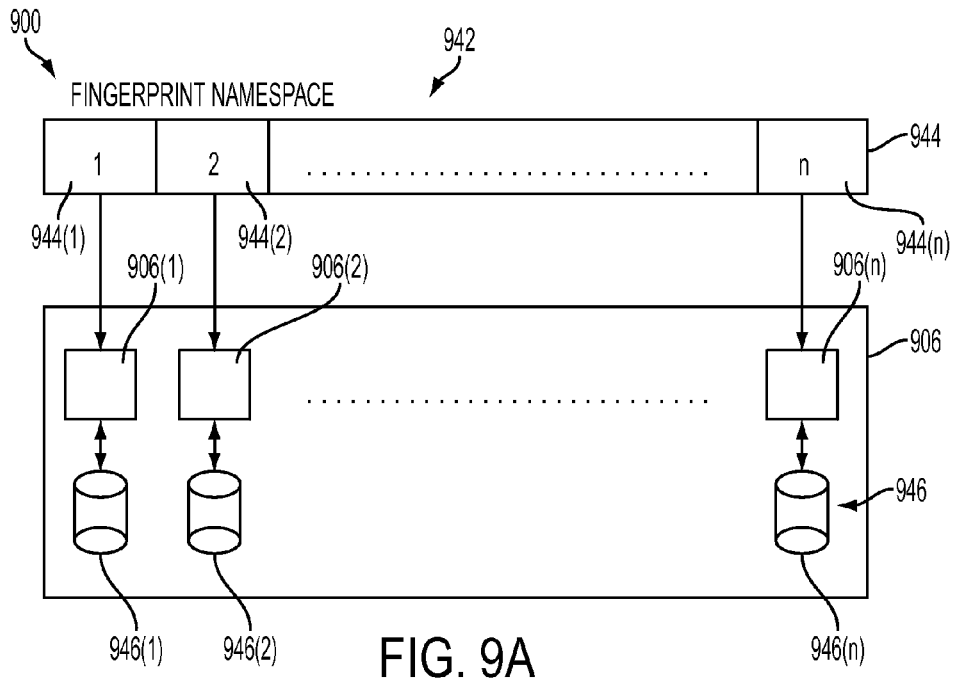
FIG. 9A illustrates a namespace partition according to principles of the invention.

FIG. 9A illustrates a namespace partition 900 according to principles of the invention. A cluster of backup servers 906 may utilize fingerprint namespace partitioning including, for example, hash-namespace partitioning. The cluster of backup servers 906 may achieve improved performance by partitioning a fingerprint namespace 942 amongst itself so that each backup server in the cluster of backup servers 906 has a partition-master designation for a part of the fingerprint namespace 942. In various embodiments, each such partition is a fingerprint partition and a backup server assigned to the partition is a partition master relative to the partition. As shown, the fingerprint namespace 942 may be divided into a plurality of fingerprint partitions 944. For example, a fingerprint partition 944(1) may be assigned to a backup server 906(1), a fingerprint partition 944(2) may be assigned to a backup server 906(2), and a fingerprint partition 944(n) may be assigned to a backup server 906(n).

In various embodiments, numerous advantages follow from utilization of the namespace partition 900 in this manner. For example, in an implementation where the fingerprint namespace 942 is, for example, a hash namespace partition, each backup server in the cluster of backup servers 906 is only required to store a part of a full hash table corresponding to an assigned partition of the hash namespace. In that way, an amount of memory required in each backup server in the cluster of backup servers 906 is increasingly manageable. In addition, when, for example, a new backup server is added to the cluster of backup servers 906, the new backup server is assigned a partition of the fingerprint namespace 942 to master and all chunks for the assigned partition are migrated to the new backup server.

Still referring to FIG. 9A, each backup server in the cluster of backup servers 906 may have data access to one of one or more pluralities of backup buckets 946. For example, the backup server 906(1) may have data access to a plurality of backup buckets 946(1), the backup server 906(2) may have data access to a plurality of backup buckets 946(2), and the backup server 906(n) may have data access to a plurality of backup buckets 946(n). A backup bucket, as used herein, aggregates a plurality of chunks into a few small files for storage. In various embodiments, this maintains an order in which each chunk in the plurality of chunks was added to a backup bucket and efficiently packs the plurality of chunks into underlying file system blocks. In a typical embodiment, each backup bucket in the one or more pluralities of backup buckets 946 is indexed so as to enable acquisition of individual chunks efficiently. Typically, a backup-bucket index is separate from storage of the plurality of chunks so that the backup-bucket index can be read in as big chunk, for example, on the order of tens of megabytes in size.

In various embodiments, it is possible to utilize the one or more pluralities of backup buckets 946 to exploit locality information for chunks of data and thereby reduce disk accesses. Locality information, as used herein, refers to information concerning how data or chunks of data are stored and accessed. As one of ordinary skill in the art will appreciate, based on principles of memory access, chunks referenced in close proximity to each other once are likely to be referenced in close proximity to each other again later. More particularly, when a client computing device accesses files or chunks in a certain order, those chunks may be considered likely to be referenced in close proximity with each other again in the future, regardless of whether a backup server or another client computing device is accessing the chunks.

Figure 9B:
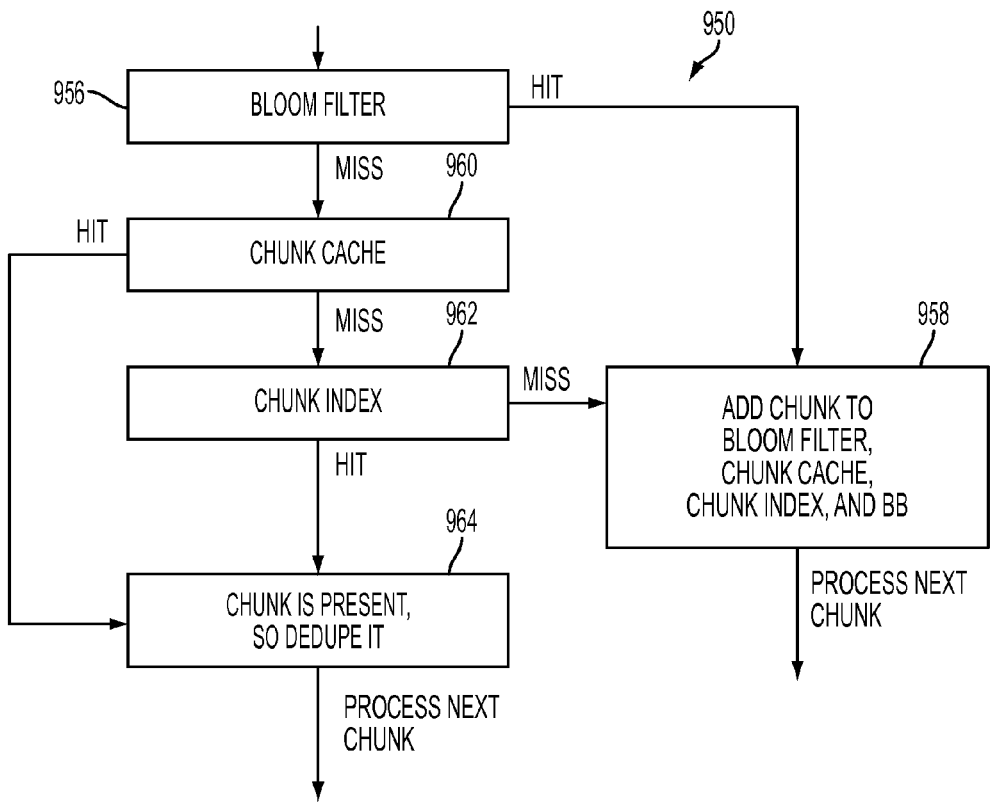
FIG. 9B illustrates a data-access hierarchy according to principles of the invention.

FIG. 9B illustrates a data-access hierarchy 950 and will be discussed in conjunction with FIG. 9A. In a typical embodiment, each backup server in the cluster of backup servers 906 may maintain a Bloom filter 956, a chunk cache 960, and a chunk index 962. The Bloom filter 956, as will be apparent to one of ordinary skill in the art, is a data structure useful for efficiently determining whether an element is a member of a set, namely, the chunk index 962. The chunk cache 960 is a cache that stores chunks that are deemed most likely to be referenced in the future. The chunk index 962 exhaustively maps every chunk maintained by a backup server to a backup bucket maintained by the backup server. As one of ordinary skill in the art will recognize, relying solely on the chunk index 962 to determine whether a chunk is present on a backup server in the cluster of backup servers 906 results in heavy demand on the chunk index 962. As shown in more detail below, utilization of the data-access hierarchy 950 can reduce this heavy demand.

As noted above, each backup bucket in the one or more pluralities of backup buckets 946 typically aggregates a plurality of chunks into a few small files. However, in various embodiments, numerous advantages may be realized by aggregating the plurality of chunks based on how the plurality of chunks were accessed by various client-computing devices and received by a backup server in the cluster of backup servers 906. In a typical embodiment, a client-computing device accesses chunks in a particular order, stores a list of the chunks in a manifest file similar to the manifest file 512(1) of FIG. 5 as the chunks are accessed, and provides the manifest file to the cluster of backup servers 906. Therefore, as a backup server in the cluster of backup servers 906 accesses a portion of the manifest file applicable to one of the plurality of fingerprint partitions 944 assigned to the backup server, locality information is present and may be preserved by, for example, aggregating the chunks in a file within one backup bucket from among the one or more pluralities of backup buckets 946. Caching benefits of this approach will be described below.

Still referring to FIG. 9B, heavy demand on the chunk index 962 may be reduced by using the data-access hierarchy 950 to deduplicate a chunk. More particularly, the data-access hierarchy 950 may be used to determine whether a chunk is already stored by a backup server in the cluster of backup servers 906. First, the Bloom filter 956 may be utilized to perform an initial check of whether the chunk is absent from the chunk index 962. If a result of utilizing the Bloom filter 956 indicates the chunk is absent from the Bloom filter 956, the result is conclusive and an update operation 958 may be performed. The update operation 958 may include, for example, adding the chunk to the Bloom filter 956, the chunk cache 960, the chunk index 962, and a backup bucket in the one or more pluralities of backup buckets 946. Any other result from the Bloom filter 956 is an inconclusive result, as one of ordinary skill in the art will appreciate, and the chunk cache 960 is checked to determine whether the chunk is one of a selected number of chunks stored therein. If so, the chunk is already present in the cluster of backup servers 906 and redundant storage of the chunk is prevented at a step 964. Instead, the system can move on to processing another chunk. If the chunk is not present in the chunk cache 960, the chunk index 962 may be accessed directly to determine whether the chunk is already stored in the cluster of backup servers 906. If the chunk is not listed in the chunk index 962, the chunk may be added to the cluster of backup servers 906 using the update operation 958, as described above.

Oftentimes, the fact that a chunk is being accessed presently is an indication that the chunk will be accessed again in the near future. In various embodiments, the data-access hierarchy 950 may be further optimized to utilize this fact in combination with locality information to further reduce demand on the chunk index 962. For example, each time a chunk is processed by the data-access hierarchy 950, that chunk and every chunk in the same backup bucket from among the one or more pluralities of backup buckets 946 may be deemed likely to be accessed in the near future. Therefore, the chunk being accessed and every chunk in the same backup bucket from among the one or more pluralities of backup buckets 946 may be added to the chunk cache 960. In this manner, in various embodiments using the data-access hierarchy 950, more chunks may be located in the chunk cache 960 without the need for accessing the chunk index 962.

Figure 10:
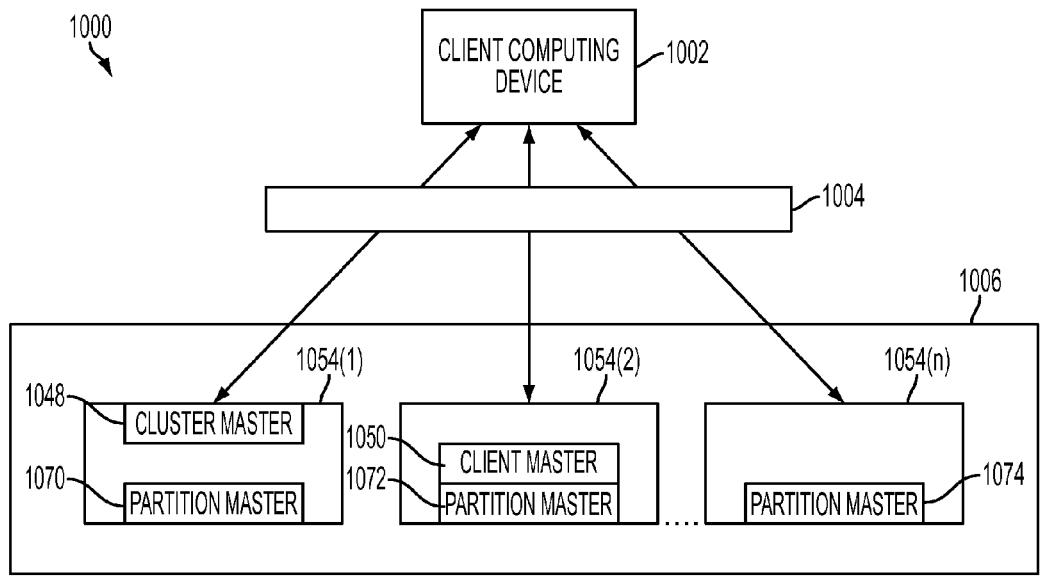
FIG. 10 illustrates an exemplary clustered environment.

FIG. 10 illustrates an exemplary clustered environment 1000. As shown, a client computing device 1002 communicates with a cluster of backup servers 1006 over a computer network 1004. The cluster of backup servers 1006 includes a backup server 1054(1), a backup server 1054(2), and a backup server 1054(n). One of ordinary skill in the art will recognize that any number of backup servers may be utilized in the cluster of backup servers 1006. The cluster of backup servers 1006, in a typical embodiment, elects a particular backup server to have a cluster-master designation 1048. The backup server 1054(1), illustrated as having the cluster-master designation 1048, is therefore operable to be a central point of contact for the cluster of backup servers 1006. A backup server having a cluster-master designation may be referenced herein as a cluster master. In a typical embodiment, the backup server 1054(1), as having the cluster-master designation 1048, owns a fail-over IP address so that clients such as, for example, the client computing device 1002, have one address to find the cluster of backup servers 1006.

In a typical embodiment, the cluster-master designation 1048 does not require any special functionality that other backup servers in the cluster of backup servers 1006 without the cluster-master designation 1048 do not already have. Consequently, in a typical embodiment, it is generally not a significant burden on either the backup server 1054(1) or the client computing device 1002. If a backup server having the cluster-master designation 1048 fails, the fail-over IP address and the cluster-master designation 1048 may be migrated to another backup server in the cluster of backup servers 1006.

Typically, each client computing device that backs up into the cluster of backup servers 1006 may be assigned a backup server within the cluster of backup servers 1006 that has a client-master designation 1050 relative to the client computing device. A backup server having a client-master designation may be referenced herein as a client master. In FIG. 10, the backup server 1054(2) has the client-master designation 1050 relative to the client computing device 1002. The client-master designation 1050 may indicate, for example, that the backup server 1054(2) manages all backups for the client computing device 1002. The assignment can be accomplished using any one of many techniques.

For example, a cryptographic hash function may be applied to a name of the client computing device 1002 to generate a fingerprint, or more specifically, a cryptographic hash signature. In that way, each backup server in the cluster of backup servers 1006 may have the client-master designation 1050 for a partition of a client namespace in a manner similar to that described above relative to partition masters in FIG. 9A. Alternatively, in other embodiments, a backup server in the cluster of backup servers 1006 having the client-master designation 1050 for a fewest number of client computing devices may be assigned a client-master designation.

Exemplary operation of the clustered environment 1000 to deduplicate chunks of data will now be described. As the client computing device 1002 initiates a backup of a block of data, the client computing device 1002 discovers from the backup server 1054(1), pursuant to the cluster-master designation 1048, a topology of the cluster of backup servers 1006 and an identity of the backup server 1054(2) as having the client-master designation 1050 relative to the client computing device 1002. Subsequently, the client computing device 1002 can transmit a manifest file and a head file to the backup server 1054(2). In a typical embodiment, the manifest file and the head file may be similar to the manifest file 512(1) of FIG. 5 and the head file 512(2) of FIG. 5, respectively. Since the backup server 1054(2) has the client-master designation 1050, the head file generally remains with the backup server 1054(2), as with any other client-specific backup information.

Typically, the backup server 1054(2) breaks the manifest file into sub-manifest files that directly correspond to fingerprint partitions such as, for example, the plurality of fingerprint partitions 944 of FIG. 9A. For example, backup servers 1054(1), 1054(2), and 1054(n) serve as partition masters pursuant to partition-master designations 1070, 1072, and 1074, as illustrated in FIG. 10. Therefore, the backup server 1054(2) may retain one sub-manifest file corresponding to its own partition and forward remaining sub-manifest files to the backup server 1054(1) and the backup server 1054(n), according to assigned partitions. Then, the client computing device 1002 may connect to each backup server of the cluster of backup servers 1006 to receive a list of chunks from the sub-manifests that are not present on the backup server. In response, the client computing device 1002 may push new chunks corresponding to the list of chunks to the backup servers 1054(1), 1054(2), and 1054(n).

As each backup server in the cluster of backup servers 1006 finishes receiving the new chunks, the backup server confirms completion to the backup server 1054(2) pursuant to the client-master designation 1050. When the backup server 1054(2) receives confirmation from each backup server in the cluster of backup servers 1006, the backup server 1054(2) notifies the client computing device 1002 of completion. In a typical embodiment, the backup server 1054(2) stores the manifest file and the head file earlier-received from the client computing device 1002 in the event data restoration is necessary.

Exemplary operation of the clustered environment 1000 to perform data restoration for a block of data will now be described. First, the backup-server 1054(1), pursuant to the cluster-master designation 1048, receives a request for a data restoration from the client computing device 1002 identifying itself as a client computing device for restoration. In that way, the client computing device 1002 discovers from the backup server 1054(1) the topology of the cluster of backup servers 1006 and the identity of the backup server 1054(2) as having the client-master designation 1050 relative to the client computing device 1002. Subsequently, the client computing device 1002 may request client-specific backup information from the backup server 1054(2) pursuant to the client-master designation 1050. The client-specific backup information may include information identifying a structure of a block of data such as, for example, a head file. For each chunk that needs to be fetched, the client computing device 1002 may send a request to backup servers in the cluster of backup servers 1006 pursuant to the partition-master designations 1070, 1072, and 1074, as appropriate. The client computing device 1002 may use the head file to walk a tree for the backup. In that way, a catalog file may be reconstructed and used to restore the block of data.

In various embodiments, the cluster of backup servers 1006 may utilize shared storage over, for example, a storage area network (SAN). In the various embodiments, high availability can be built into the cluster of backup servers 1006 using the SAN. For example, each fingerprint partition may have a file system on the SAN to hold units of data, or chunks, for the fingerprint partition. Similarly, each client partition of a client namespace may have, for example, a file system to hold head and manifest files for the client partition. As the cluster organizes itself, each backup server in the cluster of backup servers 1006 may be assigned a fingerprint partition and a client partition. A cluster master such as, for example, the backup server 1054(1), may maintain the assignments. In that way, when a backup server in the cluster of backup servers 1006 fails or otherwise leaves the cluster of backup servers 1006, the backup server's file systems may be assigned to other backup servers in the cluster of backup servers 1006.

In various other embodiments, high availability can be built into the cluster of backup servers 1006 without using shared storage. For example, each backup server in the cluster of backup servers 1006 may utilize a local disk for storage of a fingerprint partition and a client partition. To enforce high availability, each backup server in the cluster of backup servers may also be a secondary store, and mirror of, a non-overlapping fingerprint partition and client partition. In this manner, all data may be stored on at least two backup servers in the cluster of backup servers 1006. For example, if a backup server in the cluster of backup servers 1006 fails, the backup server in the cluster of backup servers 1006 having the secondary store may take over. When the backup server in the cluster of backup servers 1006 that failed comes back online, the backup server may synchronize with the secondary store and resume as before the failure.

Figure 11:
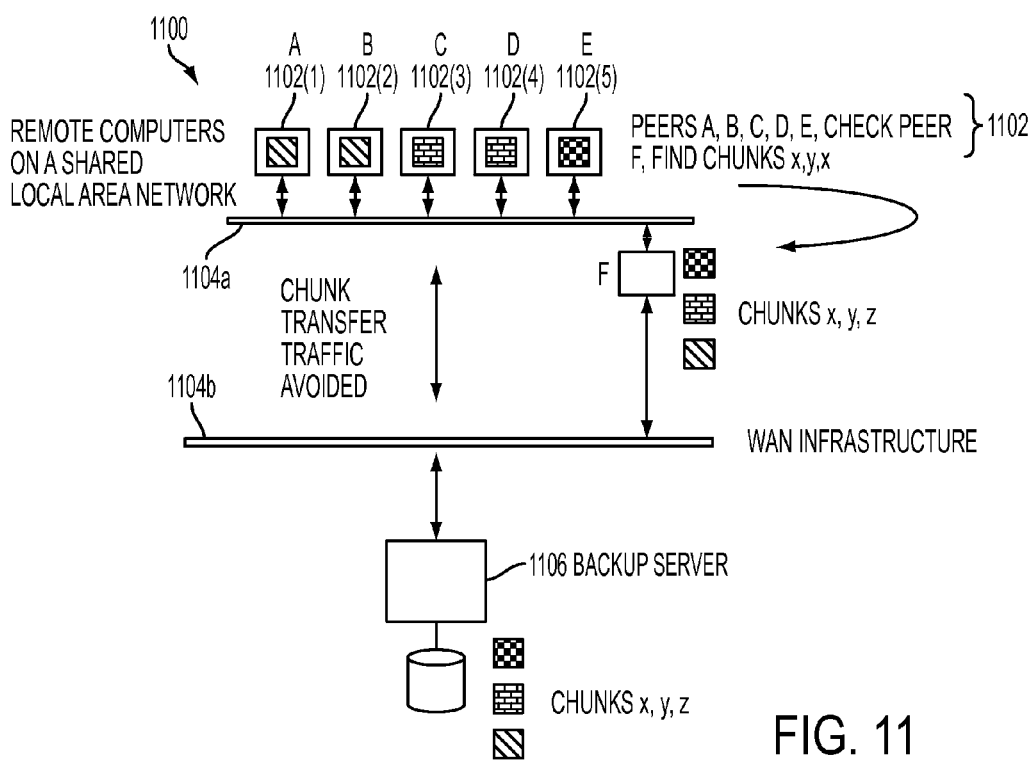
FIG. 11 illustrates peer-to-peer fingerprint sharing according to principles of the invention.

FIG. 11 illustrates peer-to-peer fingerprint sharing according to principles of the invention. A system 1100 includes client computing devices 1102(1), 1102(2), 1102(3), 1102(4), and 1102(5), referenced herein collectively as client computing devices 1102, and a backup server 1106. As shown, rather than initiate traffic to the backup server 1106 over a wide area network (WAN) 1104b, the client computing devices 1102 may, in some cases, confirm existence of a unit of data on the backup server 1106 by communicating with each other over a local area network (LAN) 1104a.

For example, a client computing device within the client computing devices 1102 typically knows any units of data that have been backed up to the backup server 1106 by virtue of, for example, saving a manifest file similar to the manifest file 512(1) of FIG. 5. In addition, the manifest file typically includes names (i.e., fingerprints) of the units of data that have been backed up. Therefore, prior to communicating with the cluster of backup servers 106, in various embodiments, a client computing device within the client computing devices 1102 may communicate a fingerprint for a particular unit of data with one or all of others of the client computing devices 1102 to determine whether the particular unit of data already exists on the backup server 1106. If one of the client computing devices 1102 confirms that the particular unit of data is present on the backup server 1106, demand on the backup server 1106 and indexes on the backup server 1106 is thereby reduced.

In some embodiments, demand on the backup server 1106 may be further reduced by enabling each client computing device of the client computing devices 1102 to deduplicate units of data within its own storage. For example, in various embodiments, each client computing device in the client computing devices 1102 may regularly evaluate units of data composing its storage for redundancy. In some embodiments, selected ones of the client computing devices 1102 may be virtual clients resident on and sharing resources of a physical server. In these embodiments, additional benefits may be realized by deduplicating data at a hypervisor layer. By deduplicating at the hypervisor layer, a single instance of deduplication software on the physical server may deduplicate data for all of the virtual clients. In that way, traffic to the backup server 1106 may be reduced.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   receiving backup information from a client computing device for a block of data comprising chunks of data, the backup information including at least a fingerprint for each of the chunks and client-specific backup information, the client-specific backup information having been created on the client computing device using a process comprising:
   dividing data files of the block of data into the chunks;
   applying a cryptographic hash to each of the chunks, thereby creating a fingerprint of contents of each of the chunks;
   creating a chunk tree of the block of data, wherein each chunk tree includes at least a root chunk;
   compiling and preserving file metadata using a process that includes at least, for each file data of the block of data, packaging the root chunk of a corresponding chunk tree with metadata about the data file; and
   creating a backup tree for the block of data based on a result of the compiling and preserving; and
   utilizing the fingerprint for each of the chunks of data, deduplicating the chunks of data in parallel at a cluster of backup servers in accordance with a fingerprint namespace comprising a universe of fingerprints for representing data chunks, each backup server of the cluster of backup servers managing data chunks having fingerprints corresponding to an assigned partition of the fingerprint namespace, the deduplicating comprising identifying ones of the chunks of data already stored by the cluster of backup servers.

2. The method of claim 1, wherein the deduplicating comprises requesting and storing ones of the chunks of data not already stored by the cluster of backup servers.

3. The method of claim 1, the method comprising designating a backup server in the cluster of backup servers as a cluster master, the cluster master being a central point of contact for the cluster of backup servers.

4. The method of claim 3, the method comprising designating a backup server in the cluster of backup servers as a client master for the client computing device, the client master managing client-specific backup information for the client computing device.

5. The method of claim 4, the method comprising partitioning a client namespace of a universe of possible names for client computing devices among the cluster of backup servers, each backup server of the cluster of backup servers managing client-specific backup information for an assigned partition of the client namespace.

6. The method of claim 1, the method comprising:
   at each backup server in the cluster of backup servers, preserving locality information for chunks of data having fingerprints in the assigned partition of the fingerprint namespace; and
   wherein the preserving comprises maintaining a plurality of backup buckets, the plurality of backup buckets encapsulating chunks of data based at least in part on a likelihood that the encapsulated chunks of data will be accessed in close proximity.

7. The method of claim 6, the method comprising:
   at each backup server in the cluster of backup servers, maintaining a universal index of data chunks managed by the backup server in accordance with the partitioning; and
   wherein the deduplicating comprises utilizing a data-access hierarchy to restrict demand on the universal index.

8. The method of claim 7, wherein the utilizing the data access hierarchy comprises:
   determining absence of a chunk of data within the universal index of data chunks via a Bloom filter;
   consulting a cache of chunks of data in response to a result of the determining being inconclusive; and
   checking the universal index of data chunks in response to the chunk of data not being found within the cache of chunks of data.

9. The method of claim 8, the method comprising adding the chunk of data to the cache of chunks of data.

10. The method of claim 9, the method comprising adding chunks of data within a same backup bucket as the chunk of data to the cache of chunks of data.

11. The method of claim 1, the method comprising sharing deduplication information for the cluster of backup servers among a plurality of client computing devices utilizing the cluster of backup servers for backup services without contacting the cluster of backup servers.

12. The method of claim 1, the method comprising:
   wherein the backup information is generated by the client computing device; and
   wherein the backup information represents a deduplication of the chunks of data within the block of data.

13. The method of claim 1, wherein the client computing device is a virtual machine and the block of data is a virtual image from the virtual machine.

14. The method of claim 1, the method comprising:
   restoring the block of data using the client-specific backup information responsive to a request.

15. The method of claim 1, the method comprising:
   adding a new backup server to the cluster of backup servers; and
   responsive to the adding, partitioning the fingerprint namespace among the cluster of backup servers, each backup server of the cluster of backup servers managing chunks of data having fingerprints corresponding to an assigned partition of the fingerprint namespace.

16. A computer-program product comprising a non-transitory computer-usable medium having computer-readable program code embodied therein, the computer-readable program code configured to be executed to implement a data-backup method comprising:
   receiving backup information from a client computing device for a block of data comprising chunks of data, the backup information including at least a fingerprint for each of the chunks and client-specific backup information, the client-specific backup information having been created on the client computing device using a process comprising:
- dividing data files of the block of data into the chunks;
- applying a cryptographic hash to each of the chunks, thereby creating a fingerprint of contents of each of the chunks;
- creating a chunk tree of the block of data, wherein each chunk tree includes at least a root chunk;
- compiling and preserving file metadata using a process that includes at least, for each file data of the block of data, packaging the root chunk of a corresponding chunk tree with metadata about the data file; and
- creating a backup tree for the block of data based on a result of the compiling and preserving; and utilizing the fingerprint for each of the chunks of data, deduplicating the chunks of data in parallel at a cluster of backup servers in accordance with a fingerprint namespace comprising a universe of fingerprints for representing data chunks, each backup server of the cluster of backup servers managing data chunks having fingerprints corresponding to an assigned partition of the fingerprint namespace, the deduplicating comprising identifying ones of the chunks of data already stored by the cluster of backup servers.

17. The computer-program product of claim 16, wherein the deduplicating comprises requesting and storing ones of the chunks of data not already stored by the cluster of backup servers.

18. The computer-program product of claim 16, the data-backup method comprising designating a backup server in the cluster of backup servers as a cluster master, the cluster master being a central point of contact for the cluster of backup servers.

19. The computer-program product of claim 18, the data-backup method comprising designating a backup server in the cluster of backup servers as a client master for the client computing device, the client master managing client-specific backup information for the client computing device.

20. The computer-program product of claim 19, the data-backup method comprising partitioning a client namespace of a universe of possible names for client computing devices among the cluster of backup servers, each backup server of the cluster of backup servers managing client-specific backup information for an assigned partition of the client namespace.

21. The computer-program product of claim 16, the data-backup method comprising:
- at each backup server in the cluster of backup servers, preserving locality information for chunks of data having fingerprints in the assigned partition of the fingerprint namespace; and
- wherein the preserving comprises maintaining a plurality of backup buckets, the plurality of backup buckets encapsulating chunks of data based at least in part on a likelihood that the encapsulated chunks of data will be accessed in close proximity.

22. The computer-program product of claim 21, the data-backup method comprising:
- at each backup server in the cluster of backup servers, maintaining a universal index of data chunks managed by the backup server in accordance with the partitioning; and
- wherein the deduplicating comprises utilizing a data-access hierarchy to restrict demand on the universal index.

23. The computer-program product of claim 22, wherein the utilizing the data-access hierarchy comprises:
- determining absence of a chunk of data within the universal index of data chunks via a Bloom filter;
- consulting a cache of chunks of data in response to a result of the determining being inconclusive; and
- checking the universal index of data chunks in response to the chunk of data not being found within the cache of chunks of data.

24. The computer-program product of claim 23, the data-backup method comprising adding the chunk of data to the cache of chunks of data.

25. The computer-program product of claim 24, the data-backup method comprising adding chunks of data within a same backup bucket as the chunk of data to the cache of chunks of data.

26. The computer-program product of claim 16, the data-backup method comprising sharing deduplication information for the cluster of backup servers among a plurality of client computing devices utilizing the cluster of backup servers for backup services without contacting the cluster of backup servers.

27. The computer-program product of claim 16, the data-backup method comprising:
- wherein the backup information is generated by the client computing device; and
- wherein the backup information represents a deduplication of the chunks of data within the block of data.

28. The computer-program product of claim 16, wherein the client computing device is a virtual machine and the block of data is a virtual image from the virtual machine.

29. The computer-program product of claim 16, the data-backup method comprising:
- restoring the block of data using the client-specific backup information responsive to a request.

30. The computer-program product of claim 16, the data-backup method comprising:
- adding a new backup server to the cluster of backup servers; and
- responsive to the adding, partitioning the fingerprint namespace among the cluster of backup servers, each backup server of the cluster of backup servers managing chunks of data having fingerprints corresponding to an assigned partition of the fingerprint namespace.

* * * * *